Sept. 4, 1962  J. B. DAMREL, JR  3,052,125
TEMPERATURE-CONTROLLED GRAVITY METER ASSEMBLY
Filed Dec. 29, 1959  2 Sheets-Sheet 2
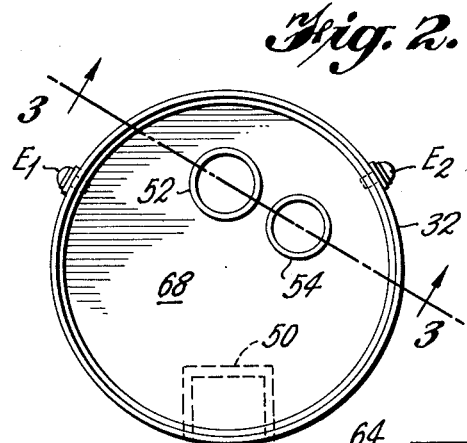
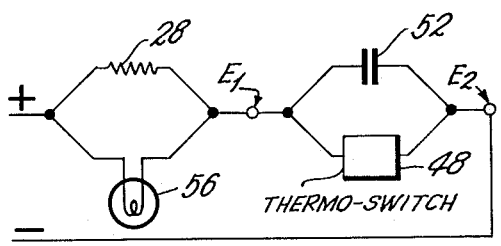
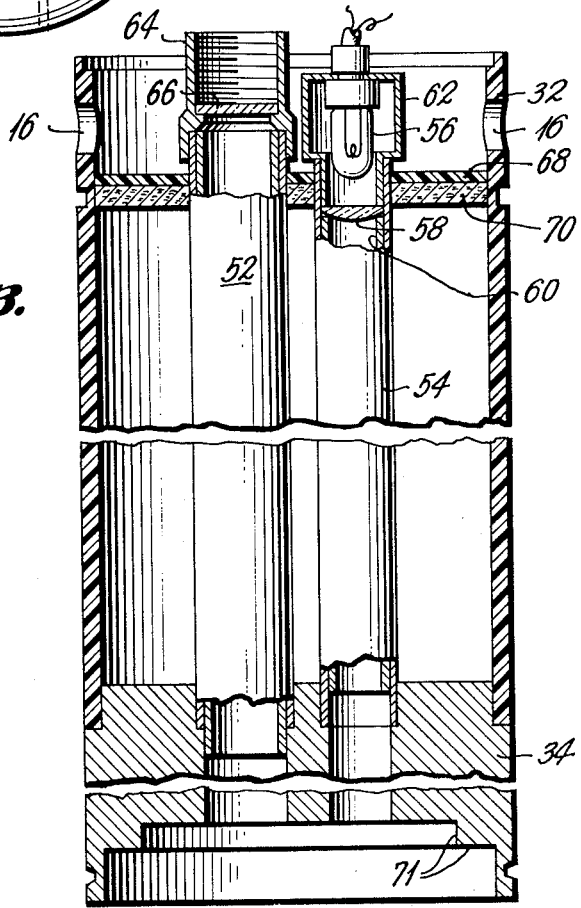
INVENTOR
John B. Damrel, Jr.
BY Stevens, Davis, Miller & Mosher
ATTORNEYS United States Patent Office 3,052,125
Patented Sept. 4, 1962

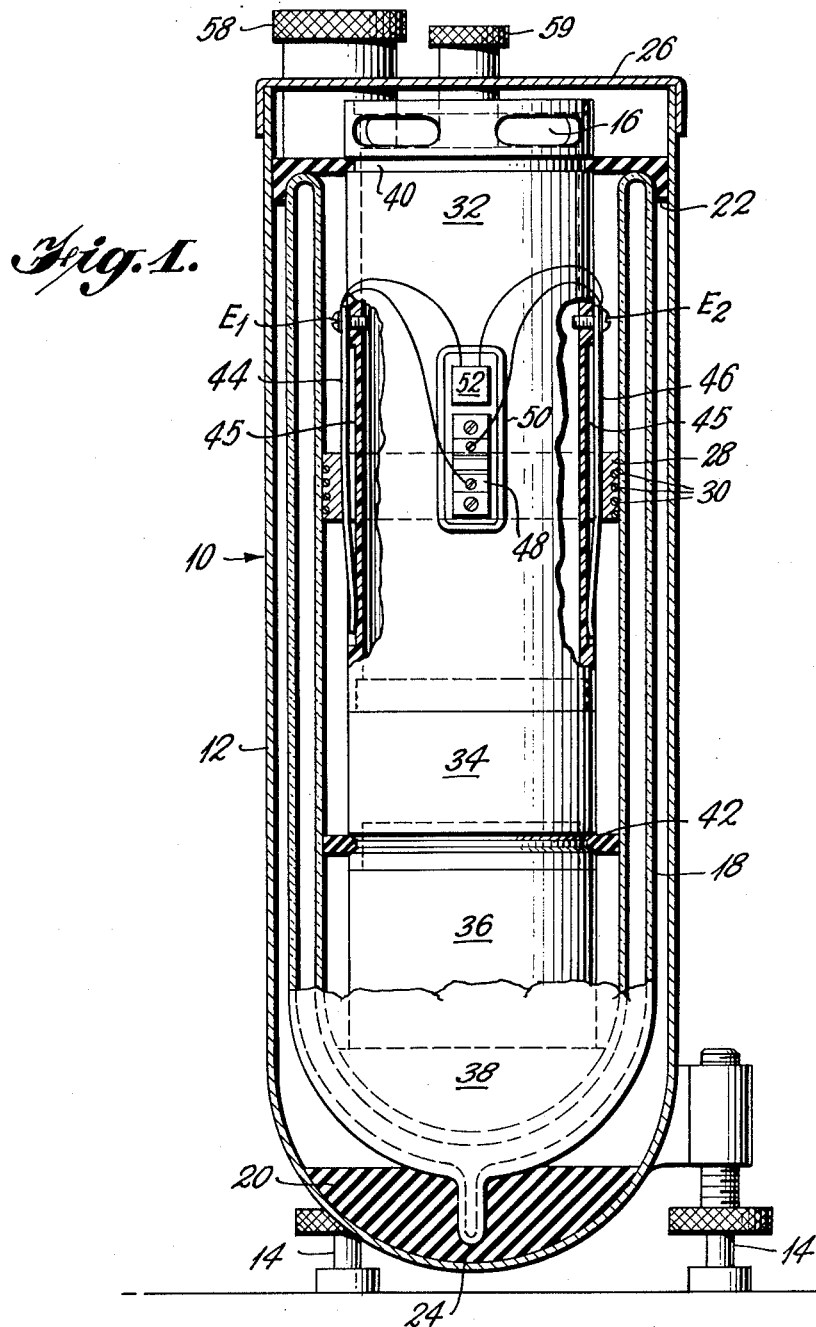

3,052,125
TEMPERATURE-CONTROLLED GRAVITY
METER ASSEMBLY
John B. Damrel, Jr., Houston, Tex., assignor to Texas Instruments Incorporated, Dallas, Tex., a corporation of Delaware
Filed Dec. 29, 1959, Ser. No. 862,695
1 Claim. (Cl. 73—382)

The present invention relates to a temperature-controlled gravity meter assembly and more particularly to a gravity meter assembly utilizing a thermal ballast to stabilize temperature fluctuations.

In gravity-sensitive instruments of the type shown in U.S. Patent No. 2,738,676, patented March 20, 1956, it is extremely desirable to maintain the temperature within the instrument between permissible limits under all operational conditions to obtain valuable results. In an instrument of the above character, wherein highly sensitive components operatively coact to give extremely accurate and delicate gravity measurements over any desired distances, temperature variations must be maintained at a minimum to eliminate any deleterious effect on the gravity-sensitive components. Accordingly, the present invention maintains the operating temperature used for a particular series of measurements substantially constant, even under severe climatic conditions, with a simple and rugged construction effectively preventing any deviation in measurement accuracy. For purposes of the present disclosure, a gravity meter of the type shown in the above-identified patent is utilized in the assembly of the present invention.

The invention in its preferred form comprises a temperature-controlled housing for a gravity meter wherein an avacuated flask is used as a housing for thermostat and heating elements encased therein along with a thermal ballast or heat sink to stabilize the temperature of the quartz elements of the gravity meter and to allow only a gradual change in the temperature of the quartz elements. The heater and thermostat are encased to allow a constant temperature to be maintained with a very low power drain from the power source which may be several standard flashlight cells, or their equivalent. In addition, the thermostat is accessible to permit setting of the desired temperature in the field to establish a suitable operating temperature. As the gravity meter can operate over a wide range of temperatures, the gravity meter should be set to operate at a temperature only a few degrees above the maximum ambient temperature to be encountered in order that a constant temperature may be maintained with a minimum expenditure of energy from the power source.

An object of the present invention is to provide a gravity meter which is maintained at a constant temperature even under severe ambient temperature conditions.

Another object is to minimize the heater power consumption required to maintain a gravity meter assembly at a constant temperature.

A further object of the invention is to provide a gravity meter assembly utilizing a heat sink to stabilize internal temperature fluctuations and maintain a substantially constant temperature.

Another further object is to provide a gravity meter assembly permitting a constant temperature to be maintained with a very low power input, and wherein the temperature may be set to maintain a desired constant temperature.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a side view, partly in section, of the preferred embodiment of the invention;

FIGURE 2 is a top view of the housing assembly utilized in the device of FIGURE 1;

FIGURE 3 is a side view of the device taken on the line 3—3 of FIGURE 2, looking in the direction of the arrows; and FIGURE 4 is a circuit diagram utilized in the preferred embodiment.

Referring now to the drawings, there is illustrated a preferred embodiment of a temperature controlled gravity meter assembly 10 comprising a bimetal thermostat 48 and a heating element 28 encased within a vacuum flask 18 with a gravity meter 36 of the type shown in the above-mentioned Patent No. 2,738,676. A thermal barrier or heat sink 34 is provided between the gravity meter 36 and the heating element 28 and thermostat 48 to minimize fluctuations in the temperature of the quartz members within the gravity meter. The heater and thermostat are encased to allow a constant temperature to be maintained with a very low power drain on a portable power source, such as several standard flashlight cells, or their equivalent. In addition, the thermostat is easily accessible to permit the setting of a particular desired temperature in the field to establish a desirably low temperature differential between the maximum external ambient temperature and the operating temperature within the vacuum flask to conserve power.

As shown in FIGURE 1, an outer housing 12 of any desirable shape and composed of any suitable material is provided to house the gravity meter assembly. In the preferred embodiment, the housing is shown as generally cylindrically-shaped with a substantially round bottom provided with integral adjustable feet 14 to bring the instrument to a level as indicated by suitable spirit levels, not shown. The spirit levels may be located adjacent the apertures 16 and within the space between outer housing 12 and housing 32. Cover 26 is used for sealing the case. Transparent windows are provided in the cover 26 to allow the spirit levels to be observed. Mounted on the cover 26 is an eyepiece 58 for reading the meter and a dial 59 for making adjustments to the gravity meter quartz element.

An evacuated flask 18 is suspended within the housing 12 and separated therefrom by a suitable resilient material 20 and 22, such as rubber, or the like. The flask is spaced from the outer housing throughout, and is preferably formed of double walls spaced apart which serve to provide thermal insulation for the assembly disposed therein. The flask is preferably composed of a suitable glass material, such as Pyrex or the like. The stability of the flask location is further enhanced by the protrusion of the flask tip 24 within the dampening or insulating material 20 to prevent a substantial displacement of the flask from the mutual vertical axis of the flask and the outer housing. The flask is retained within the outer housing by the insulating and dampening material 22. The material 22 will retain the flask within the outer housing in a suspended position to thermally and mechanically insulate the flask from the outer housing.

A heater ring 28 is provided within the evacuated flask, cemented to the interior thereof by a suitable cement. The ring is formed from a plurality of metallic segments, such as aluminum, or the like, with a suitable insulated conductive wire 30 wrapped around the segments and cemented thereto. A housing assembly 32 is concentrically mounted within the flask and operatively associated with the heater ring, as hereinafter disclosed. The housing is provided with a metallic thermal ballast 34, such as aluminum, or the like, located at the lower portion thereof and secured thereto. A gravity meter 36 of the type shown in U.S. Patent 2,738,676 is provided axially aligned and fixed to the thermal ballast 34 and supported in a spaced relationship from the evacuated flask by a suitable insulating material 38, which also serves as a packing material to dampen the gravity meter from any vibrations transmitted through the outer housing 12.

The housing assembly 32 and the axially-attached thermal ballast 34 and gravity meter 36 are supported as a unitary structure within the flask by the insulating material 38 at the bottom portion thereof and by the insulating and dampening material 22. The material 22 is formed with a flange portion adapted to fit in a suitable groove 40 provided in the housing 32 to maintain a suitable seal therebetween. If deemed necessary, a resilient mounting ring 42 may be provided cemented to the interior of the flask to assist in supporting the housing assembly 12 and the gravity meter in a predetermined co-axial position with respect to the flask 18.

The housing 32, composed of a suitable insulating material as phenolic, or the like, is provided with a number of contact spring means 44 and 46 of a suitable metal, such as beryllium copper, or the like, silver-plated to obtain desired electrical characteristics. The springs are provided to contact the heater ring 28 to provide power input to the heater. The springs 44 and 46 are secured to the housing by means of suitable screw means serving as contact points $E_1$ and $E_2$, respectively. Slot means 45 are formed in the peripheral surface of the housing 32 to provide space for the flexing of the spring means when the housing 32 is placed within the flask and the springs contact the interior surface of the heater ring 28.

A thermoswitch means 48 is provided supported within a thermoswitch case 50 on the outer periphery of the housing 32. The case 50 is fabricated of an insulating material, such as plastic, or the like, and cemented into housing 32 with a suitable cement. Also provided within the thermoswitch case is a capacitor means 52 suitably wired to the contact points $E_1$ and $E_2$, as shown in the circuit diagram of FIGURE 4.

Referring now to FIGURE 3, mounted within the housing 32 and extending through the ballast means 34 into the gravity meter, not shown but attached to flanges 71 are a pair of parallel mounted tubes, a microscope tube 52 and a light tube 54. The microscope tube 52 is provided with any selected lens arrangement and cross hair, not shown, whereby the indicating means located within the gravity meter may be visible to the operator. A source of light, such as a filament lamp 56, is provided in the light tube 54, suitably wired to a battery, not shown.

Various lenses and reflectors may be arranged within the light tube to reflect the light to the end of the tube, for example, as shown in U.S. Patent No. 2,738,676. For the purposes of the present disclosure, a plano convex-type lens 58 is retained within the light tube 54 by means of a retaining ring 60, and a lamp housing 62 is secured to the top of the tube for supporting therein the filament lamp. The lower portion of the light tube is rigidly supported within the thermal ballast 34 to prevent any axial movement thereof and to maintain it in a fixed relationship with respect to the microscope tube. The lamp housing 62 may be of light-transmitting material to allow light to pass through the apertures 16 and thereby illuminate the spirit levels mentioned above.

The microscope tube 52 is provided with a threaded socket 64 for mounting therein a suitable eyepiece, not shown. Within the socket, there is provided a microscope tube upper glass 66 to seal the end of the tube and prevent foreign matter from entering therein and con-taminating the gravity meter mechanism. The upper portion of the housing 32 is provided with a suitable plastic gasket 68 closing the upper end of the housing and maintaining the microscope tube 52 and the light tube 54 in their relative vertical alignment. A cork gasket 70 is provided in a juxtaposed relationship with the plastic gasket to assist in insulating the top end of the housing 32. The interior of the housing 32 is packed with a suitable insulating material (not shown) which, with the thermal ballast 34, minimizes temperature fluctuations in the flask 18.

FIGURE 4 illustrates a circuit diagram showing the electrical hook-up of the preferred embodiment wherein the output from a battery, not shown, is coupled to the contact $E_2$ and to the parallel-coupled capacitor 52 and thermoswitch 48. From the contact point $E_1$, the power input is directed to the parallel-coupled heater 28 and filament lamp 56. It is to be observed that the lamp is lit only when the thermostat is closed, thus giving an indication of whether the heater is operating.

In the operation of the preferred embodiment, the thermostat 48 and the heating element 28 are encased within the evacuated flask 18 with the gravity meter 36. The thermal ballast 34 is placed between the heating element and the gravity meter to act as a heat sink and allow the quartz elements within the gravity meter to change temperature only slowly. Since the heater and thermostat are encased, an almost constant temperature is maintained with a very low power drain on the batteries. In actual usage, the heater and thermostat can be operated with a power consumption in the approximate order of a 0.8 to 0.9 watt to maintain a constant temperature with a temperature differential of approximately 95° F. between the internal operating and external ambient temperatures. Since the thermoswitch 48 is located on the outside of the housing 32, it is easily accessible by simply removing the housing 32 sufficiently to expose the thermoswitch case 50.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

What is claimed is:

A temperature-controlled gravity meter assembly comprising an outer housing, an evacuated flask supported within said housing and spaced therefrom, a housing supported within said evacuated flask having spring contact means fixed thereto, said housing defining a recess along its outer periphery, a thermoswitch mounted within said recess and electrically coupled to said spring contact means, a ring heater mounted within said evacuated flask, and operatively coacting with said spring means, power source means electrically coupled to said spring contact means to provide power to said thermoswitch and said ring heater, thermal ballast means fixed to said housing, and gravity meter means fixed to said thermal ballast means so that said ballast means is located between said gravity meter and said ring heater to allow only a gradual temperature change in said gravity meter.

References Cited in the file of this patent

UNITED STATES PATENTS

| | | |
|---|---|---|
| 2,102,783 | Bokovoy | Dec. 21, 1937 |
| 2,179,892 | Lindblad | Nov. 14, 1939 |
| 2,273,711 | Klein | Feb. 17, 1942 |
| 2,470,134 | Bitner | May 17, 1948 |
| 2,570,659 | Fay et al. | Oct. 9, 1951 |
| 2,674,887 | Worden | Apr. 13, 1954 |
| 2,738,676 | Worden et al. | Mar. 20, 1956 |
| 2,858,407 | Hykes | Oct. 28, 1958 |